Figure 1:
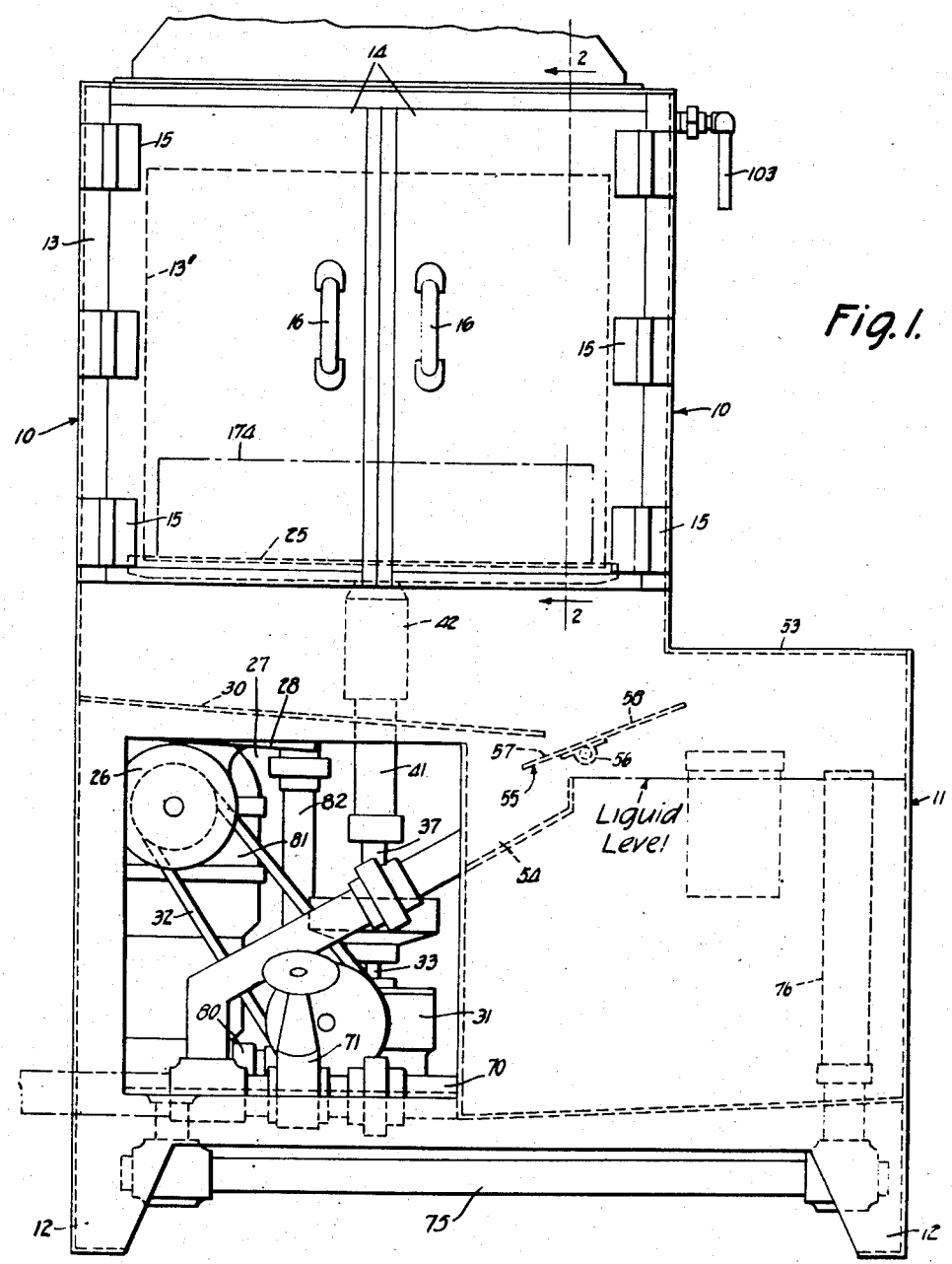

Jan. 4, 1955  E. R. ZADEMACH ET AL  2,698,628
WASHING APPARATUS
Original Filed May 12, 1948  3 Sheets-Sheet 1

INVENTORS
Erich R Zademach and
William W Clarke
BY
ATTORNEYS

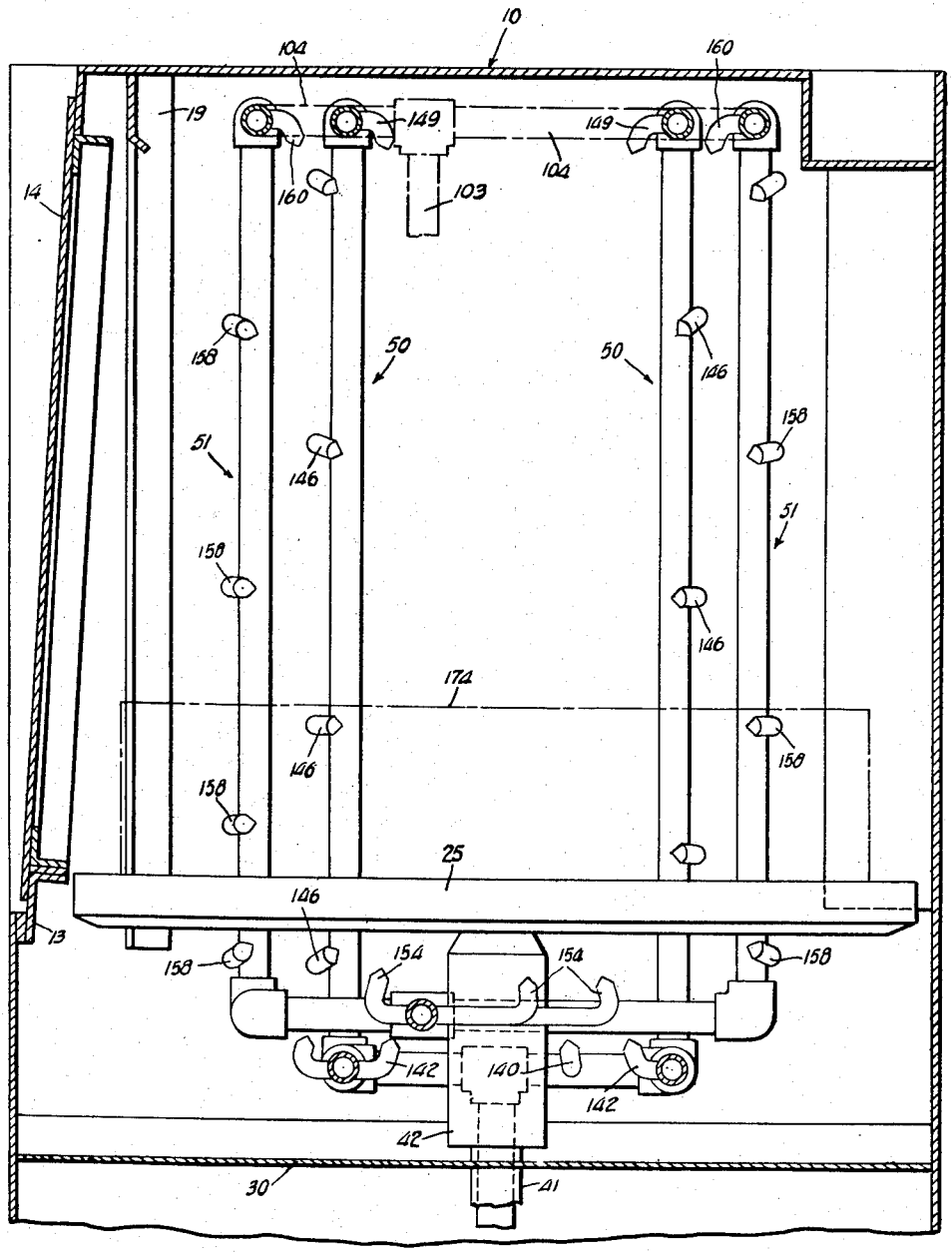

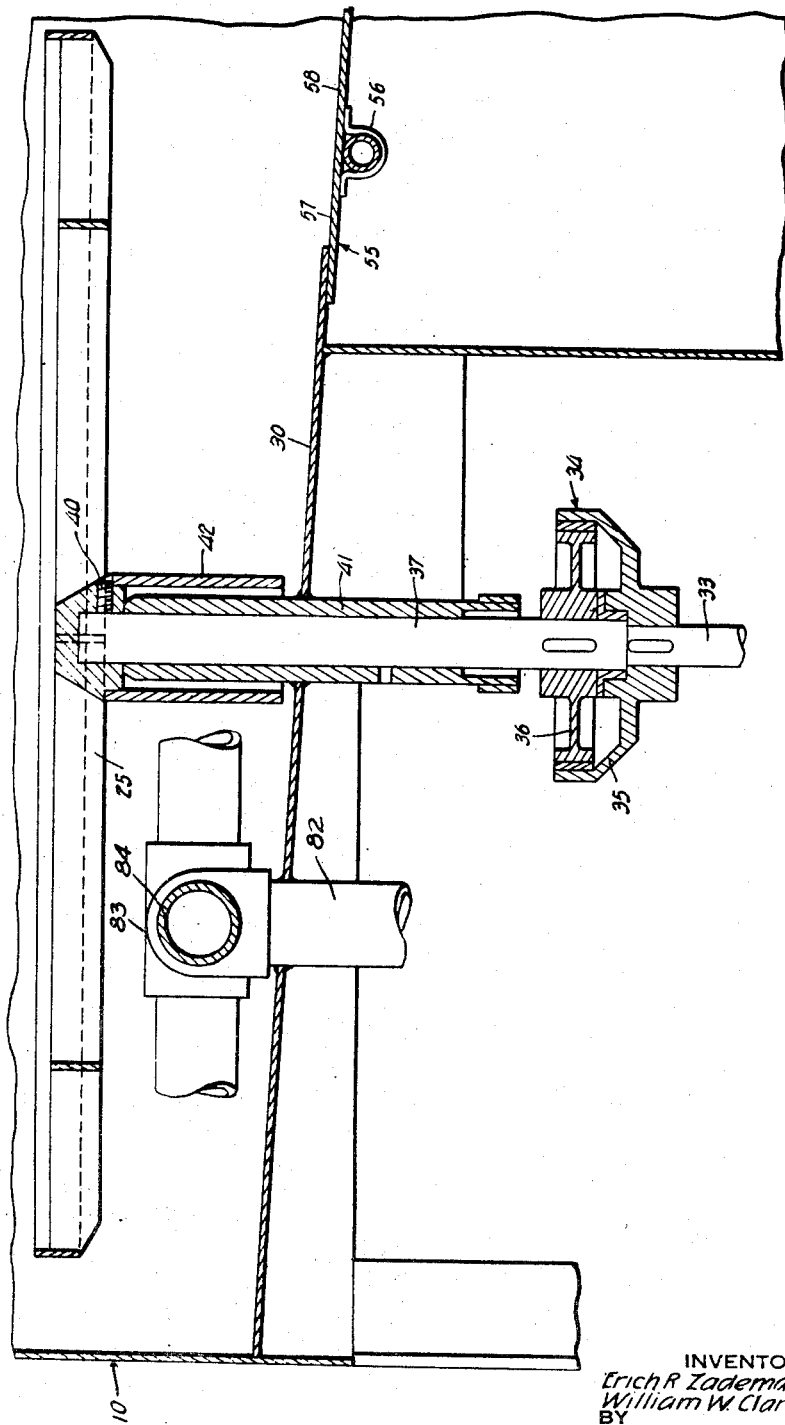

United States Patent Office 2,698,628
Patented Jan. 4, 1955

2,698,628
WASHING APPARATUS

Erich R. Zademach, Hillside, and William W. Clarke, Summit, N. J.

Original application May 12, 1948, Serial No. 26,506. Divided and this application July 3, 1951, Serial No. 242,889

1 Claim. (Cl. 134—112)

The present invention relates to apparatus which is adapted for washing pots, pans and other cooking and baking utensils and which is particularly useful in hotels, restaurants, bakeries and the like. Such an apparatus will hereinafter be referred to as a "potwasher."

One object of the present invention is to provide a new and improved pot washer, which will effectively clean pots, pans and other cooking and baking utensils in the shortest possible time, which occupies a minimum of floor space while accommodating a maximum number of these utensils.

Another object of the invention is to provide a wash chamber in which there are arranged a set of sprays and a turntable, to support utensils to be washed, the turntable having a shaft to be driven through yieldable clutch means by suitable power means, and a tubular shaft depending from the turntable to shroud the bearing of the shaft from the liquid splash in the chamber.

Various other objects are apparent from the following particular description and from an inspection of the following drawings, in which Fig. 1 is a front elevation of a form of a pot washer embodying the present invention;

Fig. 2 is a section of the pot washer taken approximately along the lines 2—2 of Fig. 1; and Fig. 3 is a detail section of the pot washer showing especially the rotary table and the bearing support therefor.

Referring to the drawings, the pot washer of the present invention comprises a wash chamber 10 disposed above a wash solution tank 11 supported by a frame structure having four short legs 12 by which the washer may be supported on a floor. The wash chamber 10 is of substantially rectangular horizontal cross-section and is provided at its front side with an opening 13' by which easy access to the interior of said wash chamber is afforded. Around this opening is a frame 13 and this opening is normally closed during washing operations by a pair of doors 14 pivotally secured to said frame 13 by hinges 15 and provided with handles 16 for manipulation into open or closed position.

A frame 19 (Fig. 3) in the chamber 10 near the doors 14 serves to reinforce the side and top wall structure of said chamber and at the same time serves as a baffle to prevent the splashings in the chamber from escaping along the chamber walls through said doors.

Supported in the interior of the wash chamber 10 is a turntable 25 adapted to support a work-basket 174 containing the utensils to be cleaned and made of openwork construction to permit fluids to pass upwardly therethrough into washing or rinsing contact with these utensils. This turntable 25 is driven from a motor 26 mounted in the upper part of an enclosed space or compartment 27 located below the work chamber 10 on one side of the wash tank 11.

The motor 26 for the turntable 25 is supported on a bracket 28 (Fig. 1) secured to the underside of a bottom floor plate 30 constituting the bottom of the work chamber 10 and sloping downwardly towards the upper section of the tank 11. This motor 26 drives the input side of a speed reduction gearing 31 through a rope and pulley drive 32. The output shaft 33 of this speed reduction gearing 31 extends upwardly (Figs. 1 and 3) and is connected to the turntable 25 desirably by means of a friction clutch 34 to insure against breakage in case the rotation of said turntable should be blocked. Also, by means of this friction clutch 34, when loading or unloading and the table is at standstill, the turntable 25 may be moved by hand and turned conveniently so that the operator does not have to reach far into the machine to reach the parts. This clutch 34 is shown in Fig. 3 comprising a drive clutch element 35 keyed to the output shaft 33 of the speed reduction unit 31 and having friction engagement with a driven clutch element 36 keyed to the lower end of an upright shaft 37 secured at its upper end to the hub 38 of the turntable 25, as for example, by means of a set screw 40. This shaft 37 is supported in a bearing 41 which is secured to the floor plate 30 of the work chamber 10 and which is desirably protected at its upper end against the splash from the spray system by means of a tubular hood 42. This hood is secured to the turntable hub 38 and shrouds the upper section of the bearing 41 with an annular clearance.

Located within the wash chamber 10 are two sets of sprays 50 and 51 (Fig. 2). The first set of sprays 50 is employed to project the wash solution such as soap or other suitable detergent in the form of high velocity streams against the utensils in the work chamber 10 and the second set of spray 51 is adapted to discharge rinsing water against these utensils. The tank 11 is adapted to contain the wash solution for the first set of sprays 50 and projects beyond one side of the work chamber 10 to provide a top having a door 53 by which access to the interior of said tank is afforded. During normal washing, the wash solution from the tank 11 is circulated between the tank and the first set of sprays 50 so that the wash solution is used over and over again. However, when rinsing, it is desirable to prevent the rinse water discharge from flowing into the tank 11 and diluting the wash solution therein. In order to selectively control the discharge from the wash chamber 10, so that it can be delivered either to the tank 11 or to a point outside said tank, as for example, to sewer, said tank has in the upper side section of its interior, a compartment 54 in the form of a trough. In the upper section of the tank 11 is a drain plate or deflecting baffle 55 supported on a hinge 56 near one end of the floor plate 30 and defining wings 57 and 58 on opposite sides of said hinge. The floor plate 30 receives the discharge not only from the first set of sprays 50 but also from the second set 51. During washing, while the first set of sprays 50 is being employed, it is desired that the discharge from these sprays be led into the tank 11 containing the wash solution. Under these conditions, the baffle 55 is swung about its hinge 56, so that it extends in substantial planar alignment with the floor plate 30. In this position, the wash solution from the first set of sprays 50 discharging onto the floor plate 30 will flow therealong and along the baffle wing 58 and will be thrown off into the tank 11. When the second set of sprays 51 is in rinsing operation, the baffle 55 is swung counter-clockwise about its hinge 56 in the position shown in Fig. 1. In this position, the rinse discharge, after it leaves the floor plate 30, is diverted by the baffle wing 57 into the trough or basin 54.

When it is desired to clean or flush out the tank 11, the valve 71 is opened, and the contents of said tank are permitted to discharge out through the pipe 70 to sewer.

The circulating system for the wash water comprises an outlet pipe 75 connected at one end to the lower end of a filter 76 in the tank 11 and connected at its other end to the inlet of a centrifugal pump 80 in the compartment 27. This pump is driven by a motor 81 in the compartment 27 and has its outlet connected to a pipe 82 which extends upwardly and which passes through the floor plate 30 of the wash chamber 10. At its upper end, this pipe 82 connects by a T 83 into a pipe 84 feeding the first spray system 50. The discharge wash liquid from this spray system 50, dropping on the floor plate 30, flows along said plate and along the baffle wing 58 back into the tank 11.

The rinsing water supply system for the sprays 51 comprises an inlet pipe 103 connected to a suitable source of clean water supply desirably from the hot water line of the kitchen and having a hand valve (not shown) for furnishing clean hot water to said tank whenever required. Pipe 103 connects into a cross-pipe 104. The ends of this cross-pipe 104 pass through the side wall of the wash chamber 10 and connect into the rinse spray system 51.

The spray system 50 includes nozzles 140, 142, 146 and 149. The spray system 51 includes nozzles 154, 158, and 160. All of the nozzles of both systems are disposed to direct fluids toward the utensils in the work basket 174 on the turntable.

The turntable 25 is of openwork or skeleton construction in order to permit the streams from the various spray nozzles to pass therethrough unimpeded.

While the invention has been described with particular reference to a specific embodiment, it is to be understood that it is not to be limited thereto but is to be construed broadly and restricted solely by the scope of the appended claim.

What is claimed is:

In a pot washer, the combination comprising a wash chamber, a floor plate for said wash chamber, a set of sprays in said chamber, a turntable adapted to hold the utensils to be washed in said chamber, power means for driving said turntable, a shaft extending into said chamber and secured at one end to said turntable, a yieldable friction clutch drivingly connecting the other end of said shaft directly to said power means, an elongated bearing extending above and below said floor plate closely surrounding said shaft along a substantial length thereof, and a tubular shaft depending from said turntable and shrouding the upper section of said bearing from the liquid splash in said chamber.

References Cited in the file of this patent

UNITED STATES PATENTS

| | | |
|---|---|---|
| 1,405,243 | Wing | Jan. 31, 1922 |
| 1,447,304 | Hauk | Mar. 6, 1923 |
| 1,466,192 | Schmelzer | Aug. 28, 1923 |
| 1,603,259 | Mathewson | Oct. 12, 1926 |
| 1,762,847 | Webb | June 10, 1930 |
| 1,862,485 | McEwan | June 7, 1932 |
| 1,867,677 | Nielsen | July 19, 1932 |
| 1,886,578 | Pedrazzo | Nov. 8, 1932 |
| 1,954,224 | Piker | Apr. 10, 1934 |
| 1,979,706 | Reamy | Nov. 6, 1934 |
| 1,997,451 | Burkle | Apr. 9, 1935 |
| 2,037,568 | Emmerling | Apr. 14, 1936 |
| 2,073,635 | Holoubek | Mar. 16, 1937 |
| 2,151,437 | Ohme | Mar. 21, 1939 |
| 2,157,112 | Bonner | May 9, 1939 |
| 2,159,365 | Barrie | May 23, 1939 |
| 2,422,022 | Koertge | June 10, 1947 |